United States Patent [19]
Vellinga

[11] Patent Number: 5,904,850
[45] Date of Patent: May 18, 1999

[54] SETTLING DEVICE FOR A FLUID CONTAINING LIQUID, GAS AND PARTICULATE MATERIAL, AS WELL AS A CLEANING DEVICE PROVIDED HEREWITH AND A METHOD FOR CLEANING WASTE WATER

[75] Inventor: Sjoerd Hubertus Jozef Vellinga, Tjalleberd, Netherlands

[73] Assignee: Paques B.V., Balk, Netherlands

[21] Appl. No.: 08/913,888

[22] PCT Filed: Apr. 10, 1996

[86] PCT No.: PCT/NL96/00156

§ 371 Date: Sep. 25, 1997

§ 102(e) Date: Sep. 25, 1997

[87] PCT Pub. No.: WO96/32177

PCT Pub. Date: Oct. 17, 1996

[30] Foreign Application Priority Data

Apr. 10, 1995 [NL] Netherlands ............................ 1000100

[51] Int. Cl.⁶ ........................... B01D 21/00; B01D 19/00; C02F 3/28
[52] U.S. Cl. .......................... 210/603; 210/802; 210/188; 210/195.4; 210/262; 210/521; 210/539; 210/532.1
[58] Field of Search .................................... 210/603, 623, 210/626, 802, 804, 188, 194, 195.1, 195.3, 195.4, 259, 262, 521, 522, 539, 532.1

[56] References Cited

U.S. PATENT DOCUMENTS

| Re. 32,597 | 2/1988 | Pette | 210/188 |
|---|---|---|---|
| 1,445,439 | 2/1923 | Imhoff et al. | 210/603 |
| 2,889,929 | 6/1959 | Kivell | |
| 3,488,926 | 1/1970 | Gilman | |
| 3,849,311 | 11/1974 | Jakubek | 210/521 |
| 4,115,279 | 9/1978 | Toft | 210/521 |
| 4,132,651 | 1/1979 | deJong | 210/522 |
| 4,202,778 | 5/1980 | Middelbeek | 210/539 |
| 4,749,480 | 6/1988 | Luhrs et al. | 210/521 |
| 5,338,445 | 8/1994 | Zumbragel et al. | 210/188 |
| 5,670,039 | 9/1997 | Harris | 210/521 |

FOREIGN PATENT DOCUMENTS

| 0 015 680 | 9/1980 | European Pat. Off. |
| 193999 | 9/1986 | European Pat. Off. |
| 244029 | 11/1987 | European Pat. Off. |
| 2 118 609 | 7/1972 | France |
| 1 936 350 | 1/1970 | Germany |
| 2 021 549 | 12/1979 | United Kingdom |
| 1 585 141 | 2/1981 | United Kingdom |

*Primary Examiner*—Christopher Upton
*Attorney, Agent, or Firm*—Young & Thompson

[57] ABSTRACT

A settling device (2) for a fluid containing liquid, gas and particulate material comprises liquid-discharge elements (15) fitted close to the water level of the fluid and supply elements for supplying the fluid at the bottom of the settling chamber. In the settling chamber one or more caps (12) are disposed with their longitudinal axis at an angle to the water level, such that fluid supplied at the bottom of the settling chamber flows obliquely up, forced along the bottom of the at least one cap. Whilst gas bubbles contained therein collect in the ridge (17) of the at least one cap. The gas collected in the ridge of the at least one cap is trapped by elements (18) beneath the water level of the fluid. Preferably, use is made of a row containing a multiplicity of caps (12) which are disposed in oblique, overlapping and parallel arrangement. The caps (12) can be fitted at an angle of 60° relative to the water level and preferably have a mutual interval of about 6 cm. The invention further relates to a purifier provided with a settling device of this kind and to a method for the anaerobic purification of waste water using a settling device or purifier according to the invention.

14 Claims, 3 Drawing Sheets

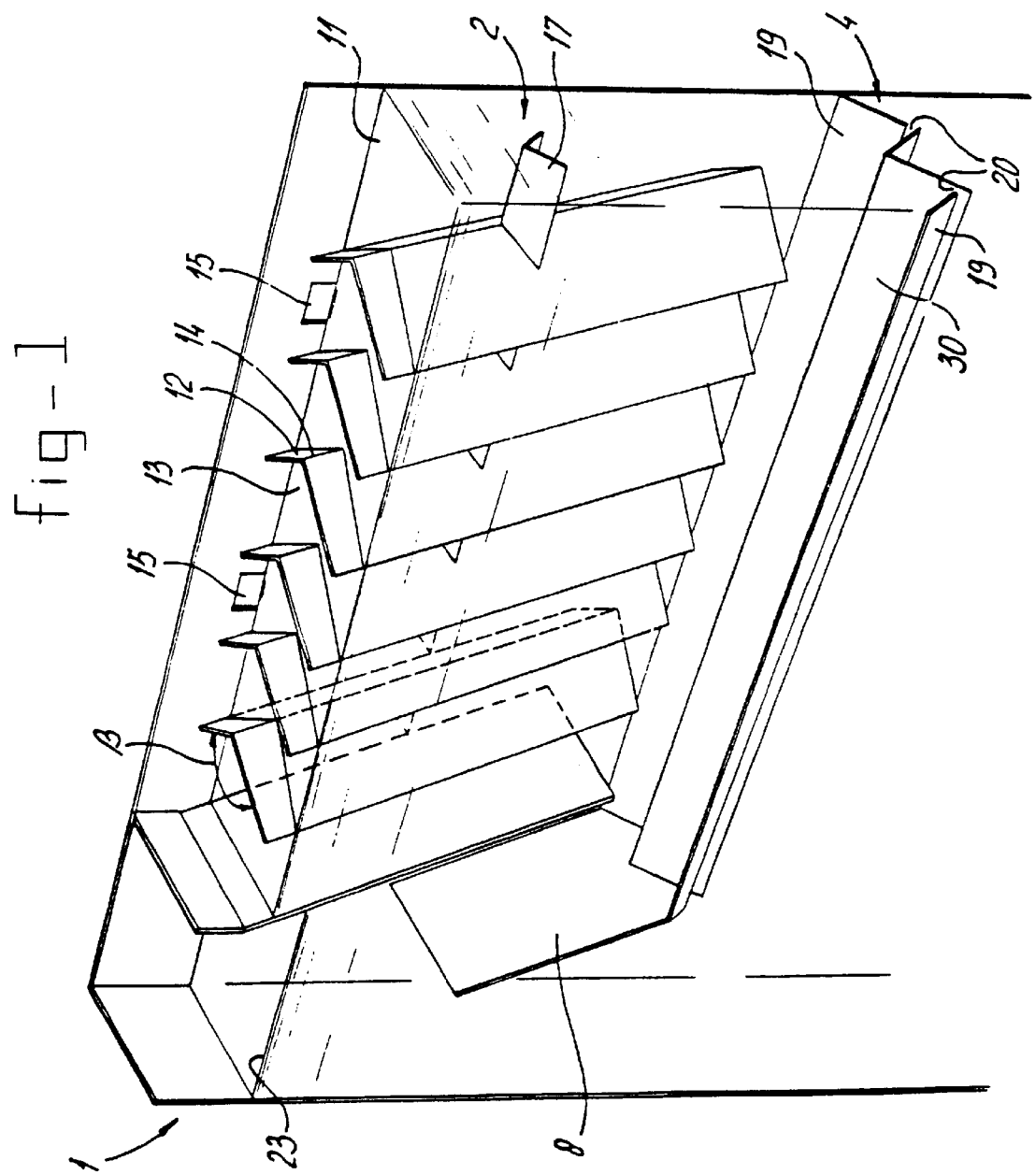

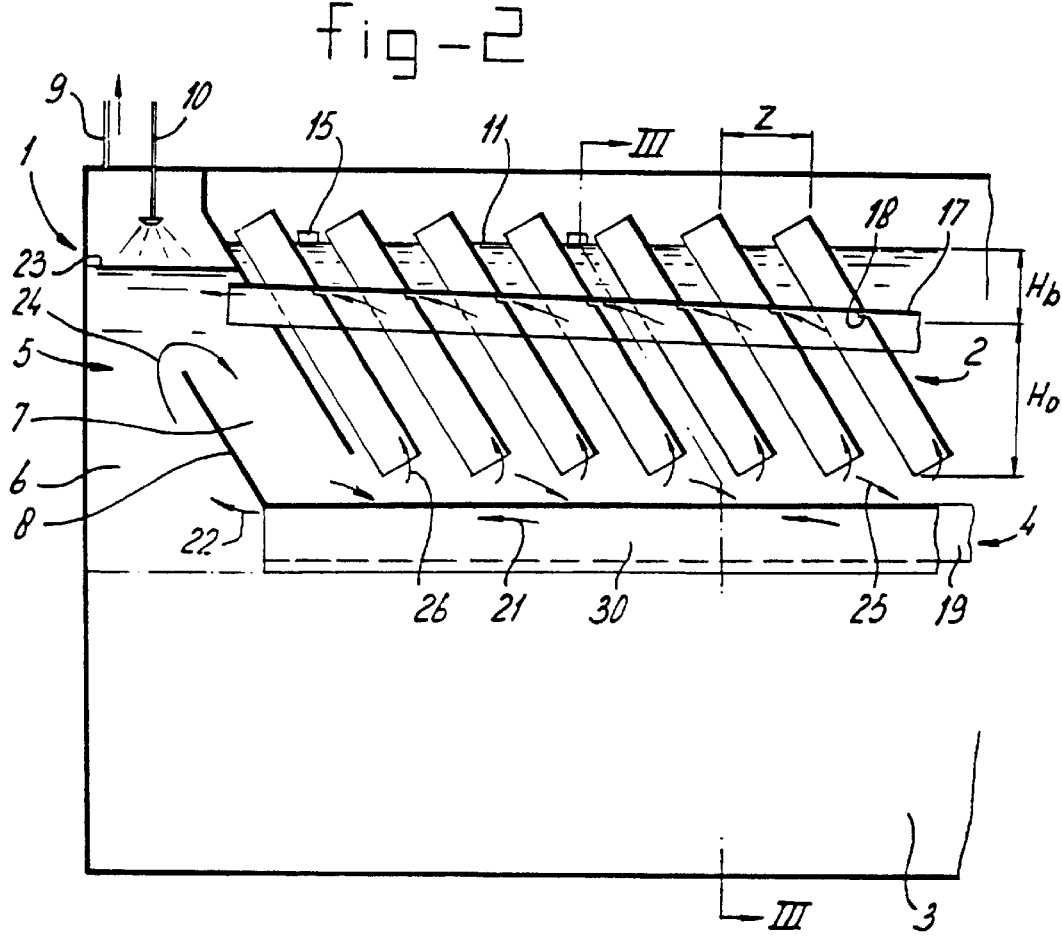
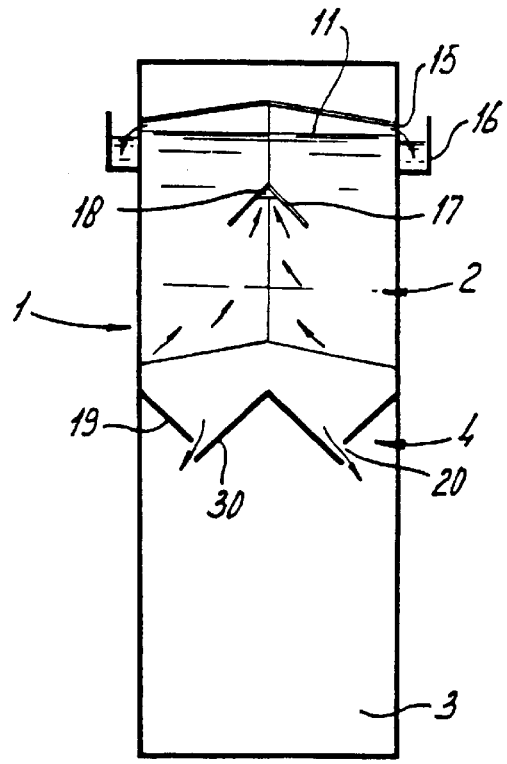

SETTLING DEVICE FOR A FLUID CONTAINING LIQUID, GAS AND PARTICULATE MATERIAL, AS WELL AS A CLEANING DEVICE PROVIDED HEREWITH AND A METHOD FOR CLEANING WASTE WATER

FIELD OF THE INVENTION

The present invention relates to a settling device for a fluid containing liquid, gas and particulate material, comprising:
- a settling chamber which is to be filled with this fluid and in which there is fitted, for the trapping of gas bubbles, at least one cap having a ridge situated opposite a downwardly directed open side,
- liquid-discharge means fitted close to the water level of the fluid,
- supply means for supplying the fluid at the bottom of the settling chamber, and
- gas-discharge means for discharging from the settling chamber gas which has been trapped beneath the cap.

BACKGROUND OF THE INVENTION

A settling device of this kind is known from EP-A1-0,244,029 and EP-A1-0,193,999. These publications describe caps which are fitted horizontally in overlapping connection and which are fitted to limit the top edge of a fermentation chamber so as to form a settling chamber above it. The caps trap gas bubbles rising from the fermentation chamber, whilst transfer of remaining fluid in the upward direction between the caps is permitted. The trapping of gas bubbles ensures that the fluid in the settling chamber is relatively still relative to the fluid in the fermentation chamber, the latter fluid being in a state of motion as a result of the rising gas bubbles. The fact that the fluid present in the settling chamber is relatively still means that particles which are present therein and have been carried along from the fermentation chamber are able to settle, these particles being able to fall back between the caps to the fermentation chamber. The settling devices known from these publications have the drawback, however, that, when major turbulences occur, bubbles can easily be passed between the caps and then make their way into the settling chamber, thereby having an adverse effect upon the settling in the settling chamber. Smaller gas bubbles, in particular will slip through easily between the caps.

The object of the present invention is, inter alia, to eliminate the above-mentioned drawbacks.

SUMMARY OF THE INVENTION

The primary object of the present invention is to provide a settling device in which a liquid, gas and particulate material can be separated, such that at the top of the settling device a liquid is collected which is largely free from particulate material and also, preferably, gas.

This object is achieved according to the invention by the fact that the at least one cap is disposed with its longitudinal axis at an angle to the water level, such that fluid supplied at the bottom of the settling chamber flows obliquely up, forced along the bottom of the at least one cap, whilst gas bubbles contained therein collect in the ridge of the at least one cap, and by the fact that the gas-discharge means trap below the water level the gas collected in the ridge of the at least one cap.

Since fluid is supplied at the bottom of the settling chamber and liquid is discharged at the top of the settling chamber, an upward flow of fluid will be generated in the settling chamber. The obliquely placed caps ensure that this upward flow follows an oblique course. During this oblique upward flow of fluid, the gas bubbles present therein will rise, as a result of their climbing capacity, more steeply than the rest of the fluid and will finally come into contact with the obliquely placed cap. The obliquely placed cap subsequently permits a further upward gas flow in the direction of the ridge of the cap. As the fluid flows obliquely upward, the gas bubbles contained therein are thus collected in the ridge of the cap. By trapping the gas collected in the ridge of the cap below the water level, this gas is prevented from setting in motion the fluid at the water level. The fluid at the top of the settling chamber will then be in a relatively still state, so that particles still contained in the fluid are deposited here more easily. By an obliquely placed cap should here be understood a body whose longitudinal axis, for the purpose of the oblique placement, runs at an angle to the water level (or horizontal) and whose bottom side, viewed in a direction perpendicular to the longitudinal axis, the so-called transverse direction, for the purpose of forming a cap, likewise runs at an angle to the water level (or horizontal). The ridge of the cap is in this case situated on the high side of the bottom side angled obliquely in the transverse direction.

A further advantage of the settling device according to the invention is that underneath the obliquely placed cap a laminar flow can be realized, which promotes the deposition of particles contained in the fluid. This laminar flow is particularly able to be realized by the fact that the gas bubbles which disrupt the laminar flow, such as described above, are separated from the fluid and are separately discharged.

It is here pointed out that so-called oblique-plate settling devices are known from the prior art, in which use is made of a number of flat plates placed obliquely in overlapping connection. In such plates, the bottom side, viewed in a direction perpendicular to the longitudinal axis (i.e. in the direction of the transverse axis of the plate), runs parallel to the water level (or horizontal). Such oblique-plate settling devices are suitable for the treatment of fluids containing liquid and particles. If these fluids contain gas bubbles, however, these gas bubbles will lend additional motion to the fluid flowing along the plates, thereby discouraging particles contained in these fluids from settling and disrupting any laminar flow.

According to an advantageous embodiment, the settling device according to the invention comprises a row containing a multiplicity of caps which are disposed in oblique, overlapping and parallel arrangement. The fluid will then be forced to flow upward via the interspaces formed between the adjacent, overlapping caps. As a result of the multiplicity of caps, gas contained in the fluid will enter more rapidly into contact with a plate and will subsequently be collected in a ridge, so that the disruptive influence of these gas bubbles upon the deposition of particles will be quicker to decline.

The trapping and discharge of gas collected in the ridge(s) can be realized in a variety of ways. For this purpose, use can be made, for example, of an inverted funnel-like element fitted in the ridge on the inner side of the cap. The narrow outlet of the funnel can in this case be connected to a pipe extending, for example, obliquely upward along the ridge, in order to discharge the gas upward via a separate duct, thereby preventing fluid close to the water level from being disturbed. According to an advantageous embodiment of the invention, the gas-discharge means can comprise a collecting pipe which extends essentially horizontally through the ridges and which on the inner side of the caps, close to the ridges, is provided with gas inlets having, for example, inverted funnel-like elements. According to another embodiment of simple design, the gas-discharge means can comprise a collecting cap extending essentially horizontally through the ridges. Such a collecting cap, which can match the oblique caps in terms of shape, will generally have a smaller width than the obliquely fitted caps. An advantage of a horizontally extending collecting pipe or collecting cap is, inter alia, that the collecting pipe or collecting cap can simultaneously serve for the suspension and mutual positioning of the oblique caps in the settling chamber. Where a collecting cap which extends through the ridges is used, it is also possible to collect and discharge floatable particles in a simple manner. By disposing the essentially horizontally extending collecting pipe or collecting cap at a slight angle of inclination relative to the water level or horizontal the discharge of gas collected therein and any floating particles is promoted.

The oblique caps of the settling device according to the invention will generally be fitted at an angle of 30° to 80° to the horizontal. Preferably, this angle will measure 55° to 65°. If the angle is too large, the gas bubbles contained in the fluid will be insufficiently trapped by the caps. If the angle is too small, an upward flow is excessively hindered. The value which is admissible for this angle will largely depend upon the process conditions and the composition of the fluid to be treated. An angle of about 55°to 65°, such as, for example, an angle of about 60°, has been shown to produce good results under diverse process conditions and with respect to diverse compositions of the fluid to be treated.

According to an advantageous embodiment, the caps are essentially V-shaped in cross-section, the angle between the legs of the V being able to measure about 100° to 130°, preferably about 110° to 120°. Such V-shaped caps are simple to produce by two plates being fastened together or by a plate being folded at a suitable angle.

A laminar flow between the caps, in which particles present in the fluid can easily be settled, can be realized according to the invention where the caps are fitted at mutual horizontal intervals of about 2 to 8 cm, preferably about 6 cm.

The invention further relates to a purifier for, for example, the anaerobic purification of waste water, comprising:

a fermentation chamber, a settling device according to the invention, which is fitted above the fermentation chamber, a degassing chamber, which is situated next to the settling device and which is divided by a partition into a first, relatively gas-rich compartment and a second, relatively gas-starved compartment, both compartments being interlinked at the top side of the partition and the degassing chamber being here provided with a gas discharge, the gas-rich, first compartment being linked to the fermentation chamber and the gas-starved, second compartment opening out into the bottom of the settling chamber of the settling device, and separating means fitted between the fermentation chamber and the settling chamber of the settling device, which separating means trap gas bubbles rising in the fermentation chamber and discharge them to the first compartment of the gas-collecting chamber and conduct particles deposited in the settling chamber back to the fermentation chamber.

In the fermentation chamber there is sludge, which cleans waste water supplied in an anaerobic environment to the fermentation chamber. Rising gas bubbles are thereby produced, which set the fluid in the fermentation chamber into violent motion, whereupon sludge particles and other particles swirl through the fluid. The gas bubbles are trapped by the separating means and led away to the first compartment of a degassing chamber linked to the fermentation chamber. The gas bubbles will rise up in this first compartment and, as a result of the high gas-bubble concentration, produce an upward flow of fluid in this first compartment. At the top of the degassing chamber, gas is able to escape from the fluid and larger, floatable particles will continue to float out of the fluid. The escaped gas and the floating particles can then be discharged, after which a fluid remains which is poorer in gas and particles. This fluid, which is poorer in gas and particles, is subsequently conducted onward via a second compartment so as to reach the bottom of the settling chamber of the settling device. The fact that the fluid undergoes a downward motion as it is conducted through the second compartment means that a portion of the gas bubbles which are still being transported can flow back in the opposite direction so as to escape from the fluid at the top of the degassing chamber and be able to be discharged. The fluid is subsequently conducted via the settling device already described above, whereupon gas which still remains is further able to escape and particles which are still present are able to be deposited from the fluid. The deposited particles fall back to the bottom of the settling device and make their way onto the separating means between the fermentation chamber and the settling chamber. From here, the deposited particles can be led back to the fermentation chamber. Using such a purifier, waste water such as waste water from breweries, for example, or sludge-containing waste water, can be very well cleaned. Various sorts of bacteria and supports therefor can be added to the fermentation chamber, depending upon the sort of waste water. Biomass and/or sludge can be situated in the fermentation chamber for the anaerobic or aerobic purification of the waste water. In purifiers of this kind, the escaping gas will usually comprise $O_2$, $CO_2$, $H_2$, either alone or in combination with each other or with other gases.

According to a very advantageous embodiment, the separating means herein comprise essentially horizontally fitted gas caps, which are disposed side by side and so that they overlap somewhat with their bottom ends, such that there is a vertical gap between the bottom ends of the adjacent gas caps to enable the particles deposited in the settling chamber to be conducted back to the fermentation chamber.

For the gas caps, a large number of gas caps known from the prior art can be used. Reference should particularly be made to those gas caps fitted above a fermentation chamber which are known from European patent applications EP-A1-0,193,999 and EP-A1-0,244,029 of the applicant, which gas caps, by being referred to as part of the present application, are herein incorporated.

The invention further relates to a method for the anaerobic or aerobic purification of waste water using a device according to the invention.

BRIEF DESCRIPTION OF THE DRAWINGS

The invention will be explained in greater detail below with reference to the appended drawing. A purifier according to the invention is illustrated by way of example in this drawing, in which:

FIG. 1 shows a diagrammatic view in perspective of a purifier according to the invention;

FIG. 2 shows a diagrammatic, partially exploded side view of FIG. 1;

FIG. 3 shows a cross-section according to the lines III—III in FIG. 2;

DESCRIPTION OF THE PREFERRED EMBODIMENTS

Figure 4:
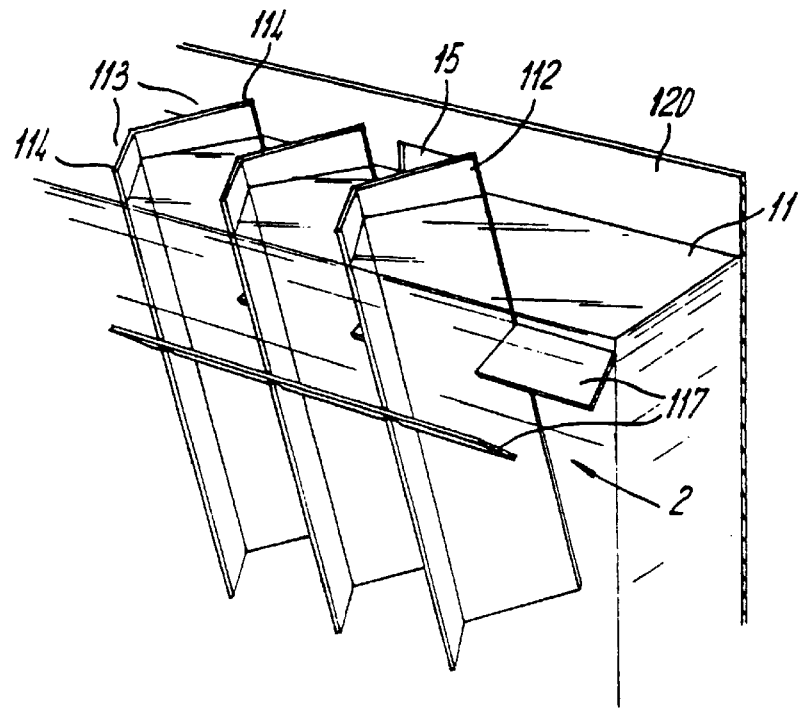
FIG. 4 shows a detail of FIG. 1, in which, however, the caps 12 are fitted in a different, alternative manner.

The figures show a cleaning device 1 according to the invention, more particularly provided with a settling device 2 according to the invention.

The cleaning device comprises a reaction chamber, such as a fermentation chamber 3 above which there is fitted a settling device 2. The fermentation chamber 3 and the settling device 2 are separated from each other by means of separating caps 4 (shown in purely diagrammatic representation), as known from EP-A1-0,244,029 and EP-A1-0,193,999 (herein incorporated by reference). The cleaning device further comprises a degassing chamber 5 comprising a first compartment 6 and a second compartment 7, which compartments are separated from each other by an oblique partition 8. At the top side of this partition 8, the compartments 6 and 7 pass into each other. At the top of the degassing chamber 5 there is provided a gas discharge 9 and a spray device 10 for spraying water with the aim of releasing gas bubbles attached to floating particles from said particles. At the top of the degassing chamber, at the level of the water level 23, there is likewise provided a discharge (not represented) for floating particles.

The settling device 2 comprises a multiplicity of V-shaped caps 12, which are placed obliquely at an angle of 60° to the water level 11 of the fluid. Each cap 12 has a downwardly directed open side 13 and an opposing ridge 14. The angle β between the legs of the V-shaped cap here measures about 110°. At the top of the settling chamber of the settling device there are fitted, close to the water level 11 of the fluid, liquid discharge means in the form of overflow holes 15. These overflow holes 15 form a connection to a drain 16. The horizontal interval Z between two adjacent oblique caps here measures about 6 cm. The oblique caps 12 are positioned relative to each other by means of an essentially horizontally extending, V-shaped collecting cap 17 and are suspended by means of those caps 17 in the settling chamber of the settling device. This collecting cap 17 extends through the ridges 14 of the row of successive, mutually partially overlapping caps 12. Just below the ridge of the collecting cap 17, passages 18 are formed in the ridges of the oblique caps 14 for the conduction of, in particular, gaseous fluid. The collecting cap 17 is preferably inclined somewhat obliquely toward the degassing chamber 5 and opens out into the degassing chamber 5. Gases collected beneath the collecting cap 17 and floating particles are then discharged automatically, as it were, to the degassing chamber.

In the example illustrated, the separating means 4 comprise a whole cap 30 and two half caps 19 fitted next to the latter and in somewhat overlapping arrangement. The bottom ends of the caps 30 and 19 are fitted so that they overlap in such a way that a vertical gap 20 is here formed, which is delimited by the bottom end of the cap 19 situated above and the top face of the cap 18 situated below. Via this gap 20, particles and fluid are able to flow back to the fermentation chamber 3 below it.

The above-described purifier functions, as a whole, as follows:

Present in the fermentation chamber 3, for example, are biomass, bacteria, support material for these, sludge and other particles. Waste water is supplied to the fermentation chamber via means (not shown), preferably continuously. The waste water is cleaned by the bacteria and/or other means located in the fermentation chamber, thereby generating gas such as $O_2$, $CO_2$, $H_2$. This gas formation sets the fluid in the fermentation chamber into violent motion, as a result of which particles located in the fermentation chamber start to float around. The rising gas bubbles are in large part trapped by the caps of the separating means 4. As illustrated by the arrows 21 and 22, this trapped gas is conducted to the first compartment 6 of the degassing chamber 5. Here, the gas will further rise, thereby producing an upward flow of fluid. Fluid from the fermentation chamber 3 will consequently be guided upward, whereupon many particles contained in the fluid will be carried along. The larger gas bubbles will leave the fluid at the top of the degassing chamber 5 and will be able to be discharged via a gas discharge 9. Floatable particles which are carried along with the fluid out of the fermentation chamber 3 will end up floating on the water level 23 at the top of the degassing chamber. These floating particles can subsequently be discharged and gas bubbles attached thereto are able to be released by means of the spray device 10.

As a result of the gas which rises from the fermentation chamber and from the separating means 4, the fluid, as is indicated by the arrow 24, will be transported further obliquely downward via the second compartment 7 to the bottom of the settling device 2. As it flows downward through the second compartment, a portion of the gas still present in the fluid can rise as bubbles counter to the flow direction and collect at the top of the degassing chamber 5, so as then to be dischargeable via a gas discharge 9. As is represented by arrows 25, at the bottom of the settling device 2 a portion of the fluid will flow back via the gaps 20 to the fermentation chamber, particles deposited in the settling device 2 being able to be carried along. As is represented by arrows 26, another portion of the fluid will be forced to flow along the obliquely fitted caps 12, after which finally, at the top of the settling device, fluid is discharged from the purifier via the overflow holes 15.

During this forced upward flowing of the fluid along the bottom of the obliquely fitted caps 12, a laminar flow will be formed in which heavier particles still present in the fluid will be easily deposited. Those gas bubbles which are still present in the fluid and disrupt such a laminar flow and lighter, floatable particles will rise vertically, or in any event more steeply than the fluid itself, as a result of the upward lifting force which is thereby encountered. These bubbles and lighter particles are then forced into contact with an oblique face of a cap and will be conducted by this oblique face of the cap in question to the ridge 14 of the cap in question. Along the inner side of this ridge 14, the gas and the lighter particles will then rise further until being trapped by the gas-discharge means fitted below the water level 11, in this case in the form of an essentially horizontally fitted collecting cap 17. The gas and the lighter particles collect in the collecting cap 17 and flow via the openings 18 along the bottom of the collecting cap 17 to the degassing chamber 5, where the gas can further be discharged via the gas discharge 9 and the lighter particles via the discharge for these (not shown). The fluid above the collecting cap 17 is virtually totally rid of gas and lighter, floatable particles, thereby promoting the further settling of heavier particles still contained in the fluid. The uppermost layer of the fluid in the settling device, i.e. the fluid layer located close to the water level 11, will be very low in particles floating through it. This fluid, which is very low in particles, can further be discharged as purified fluid via the overflow holes 15 and the discharge ducts 16.

It will be clear that the settling device according to the invention can be used in a variety of ways. Use in connection with the purifier which is here outlined is very advantageous, but by no means the only usage option. It will additionally be clear that the direction in which the cap(s) 12 is (are) obliquely fitted may vary. That is to say, with reference to FIGS. 1 and 2, that the caps 12 can also incline obliquely to the right instead of obliquely to the left, as represented), or obliquely to the front or obliquely to the rear, whilst, here too, variants lying therebetween are conceivable.

FIG. 4 shows a design variant of the settling device according to the invention. The difference with FIGS. 1–3 is essentially that the obliquely placed caps 12 of FIGS. 1–3 are rotated by 180° relative to their obliquely running longitudinal axes and, in FIG. 4, are indicated as caps 12. The caps 112 lie with their longitudinal side edges in sealing arrangement against the side walls 120 of the settling chamber 2. Each cap 112 comprises, as it were, two open downward-facing sides 113 and two ridges 114. The ridges 114 are in this case situated along the side walls 120 of the settling chamber. Instead of a V-shaped collecting cap 17, in the case of each ridge 114 there is provided an oblique, essentially horizontally running plate 117, which is placed with its top edge against the side wall 120 of the settling chamber 2. In the embodiment according to FIG. 4, each (V-shaped) cap 112 thus forms, as it were, two caps.

Figure 5:
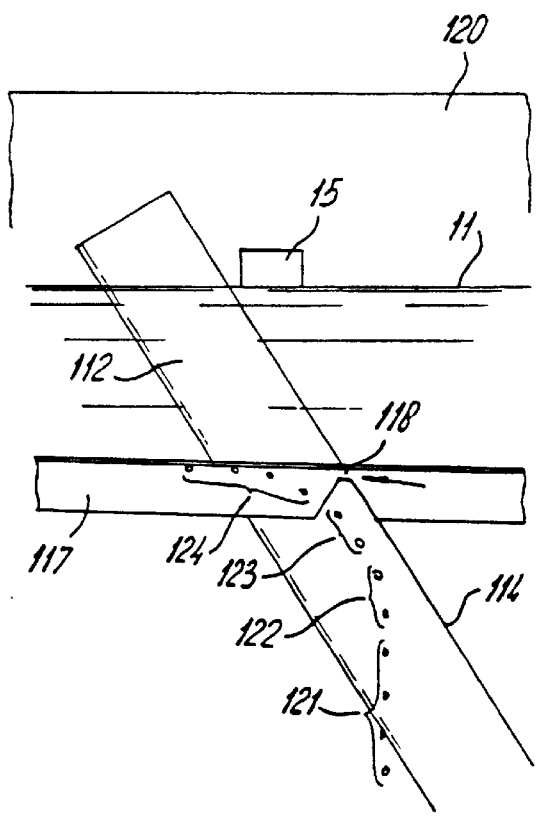
FIG. 5 shows a diagrammatic representation of the path covered by a rising gas bubble in the settling device.

FIG. 5 shows, with reference to a detail of FIG. 4, the course of a gas bubble in the settling device according to the invention. In zone 121, the gas bubble rises essentially vertically until the gas bubble comes into contact with the cap 112. In zone 122, the gas bubble is then conducted along the bottom of the cap 112 to the ridge 114. Having arrived in the ridge 114, the gas bubble is conducted along the bottom of the ridge 114 to the collecting cap 117 (zone 123) so as subsequently to be discharged via the collecting cap 117 (zone 124).

I claim:

1. Settling device for a fluid containing liquid, gas and particulate material, comprising:
    a settling chamber having a bottom and adapted to be filled with said fluid;
    liquid-discharge means disposed close to the water level for discharging liquid from the settling chamber;
    supply means for supplying the fluid at the bottom of the settling chamber;
    a row of oblique caps each having a ridge situated opposite a downwardly directed open side and extending in a longitudinal direction of the cap, the row of caps being located in the settling chamber and disposed in overlapping and parallel arrangement with their longitudinal axes at an angle to the horizontal, such that fluid supplied at the bottom of the settling chamber flows obliquely up, forced along the underside of the oblique caps, and gas bubbles contained therein collect in the ridges of the oblique caps;
    gas discharge means for trapping gas collected in the ridges of the oblique caps, and for discharging said trapped gas from the settling chamber, said gas discharge means including a collecting cap extending essentially horizontally through the ridges of the oblique caps, and said collecting cap being disposed below the water level.

2. The settling device according to claim 1, wherein the collecting cap is disposed at a slight angle of inclination relative to the horizontal.

3. The settling device according to claim 1, wherein the oblique caps are suspended in the settling chamber and positioned relative to each other by the collecting cap.

4. The settling device according to claim 1, further comprising a passage formed just below the collecting cap in the ridge of each oblique cap.

5. The settling device according to claim 1, wherein the oblique caps extend above the water level.

6. The settling device according to claim 1, wherein the oblique caps are disposed at mutual horizontal intervals of 2 to 8 cm.

7. The settling device according to claim 1, wherein the oblique caps are disposed at an angle of 30° to 80° to the horizontal.

8. The settling device according to claim 1, wherein the oblique caps are disposed at mutual horizontal intervals of about 6 cm, and at an angle of 55 to 65° to the horizontal.

9. The settling device according to claim 1, wherein the oblique caps are essentially V-shaped in cross-section, and the angle between the legs of the V measures about 100 to 130°.

10. A purifier for the aerobic or anaerobic purification of waste water, comprising:
    a reaction chamber;
    a settling device positioned above the reaction chamber, said settling device comprising:
        a settling chamber having a bottom and adapted to be filled with said fluid;
        liquid-discharge means disposed close to the water level for discharging liquid from the settling chamber;
        supply means for supplying the fluid at the bottom of the settling chamber;
        a row of oblique caps each having a ridge situated opposite a downwardly directed open side and extending in a longitudinal direction of the cap, the row of caps being located in the settling chamber and disposed in overlapping and parallel arrangement with their longitudinal axes at an angle to the horizontal, such that fluid supplied at the bottom of the settling chamber flows obliquely up, forced along the underside of the oblique caps, and gas bubbles contained therein collect in the ridges of the oblique caps;
    gas discharge means for trapping gas collected in the ridges of the oblique caps, and for discharging said trapped gas from the settling chamber, said gas discharge means including a collecting cap extending essentially horizontally through the ridges of the oblique caps, and said collecting cap being disposed below the water level;
    a degassing chamber situated next to the settling device, and divided by a partition into a first compartment and a second compartment, both compartments being fluidly interconnected at the top side of the partition, said degassing chamber including a gas discharge, the first compartment fluidly communicating with the reaction chamber and the second compartment opening out into the bottom of the settling chamber of the settling device; and
    separating means positioned between the reaction chamber and the settling chamber, said separating means structured and arranged to trap gas bubbles rising in the reaction chamber and discharge them to the first compartment of the gas collecting chamber and conduct particles deposited in the settling chamber back to the reaction chamber.

11. The purifier according to claim 10, wherein the separating means comprise essentially horizontally fitted gas caps disposed side by side, said gas caps having overlapping bottom ends which define a vertical gap between the bottom ends of the adjacent gas caps for enabling particles deposited in the settling chamber to be conducted back to the reaction chamber.

12. The purifier according to claim 10, wherein the collecting cap has one of its ends extending into the degassing chamber.

13. Method for the separation of a fluid containing liquid, gas and particulate material, comprising:

providing a settling device having a settling chamber with a bottom;

supplying fluid at the bottom of the settling chamber, said settling chamber having a row of oblique caps disposed therein, each cap having a ridge situated opposite a downwardly directed open side and extending in a longitudinal direction of the cap, the row of caps being disposed in overlapping and parallel arrangement with their longitudinal axes at an angle to the horizontal, such that fluid supplied at the bottom of the settling chamber flows obliquely up, forced along the underside of the oblique caps;

collecting gas bubbles in the ridges of the oblique caps; and discharging trapped gas from the settling chamber via gas discharge means including a collecting cap extending essentially horizontally through the ridges of the oblique caps, said collecting cap being disposed below the water level.

14. Method for the anaerobic purification of waste water, comprising:

providing an anaerobic fermentation chamber;

providing above the reaction chamber a settling device having a settling device with a bottom;

supplying the waste water at the bottom of the settling chamber, said settling chamber having a row of oblique caps each having a ridge situated opposite a downwardly directed open side and extending in a longitudinal direction of the cap, the row of caps being disposed in an overlapping and parallel arrangement with their longitudinal axes at an angle to the horizontal, such that waste water supplied at the bottom of the settling chamber flows obliquely up, forced along the underside of the oblique caps;

providing a degassing chamber next to the settling device, said degassing chamber being divided by a partition into a first compartment and a second compartment, both compartments being fluidly interconnected at the top side of the partition, the degassing chamber including a gas discharge, a first compartment fluidly communicating with the fermentation chamber and the second compartment opening out into the bottom of the settling chamber;

providing gas discharge means for trapping gas collected in the ridges of the oblique caps, said gas discharge means including a collecting cap extending essentially horizontally through the ridges of the oblique caps, said collecting cap being disposed below the water level; and providing separating means positioned between the fermentation chamber and the settling chamber, said separating means trapping gas bubbles rising in the reaction chamber and discharging them to the first compartment, and conducting particles deposited in the settling chamber back to the reaction chamber.

* * * * *